United States Patent
Mordukhovich et al.

(10) Patent No.: US 9,206,898 B2
(45) Date of Patent: Dec. 8, 2015

(54) APPARATUS AND METHOD FOR OPERATING A CLUTCH IN A TRANSMISSION

(75) Inventors: Gregory Mordukhovich, Bloomfield Hills, MI (US); Michael B. Viola, Macomb Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 313 days.

(21) Appl. No.: 13/105,204

(22) Filed: May 11, 2011

(65) Prior Publication Data

US 2012/0290167 A1 Nov. 15, 2012

(51) Int. Cl.
 *F16D 48/06* (2006.01)
 *G06F 19/00* (2011.01)
 *F16H 61/12* (2010.01)
 *F16H 61/688* (2006.01)

(52) U.S. Cl.
 CPC .............. *F16H 61/12* (2013.01); *F16D 48/06* (2013.01); *F16H 61/688* (2013.01); *B60Y 2300/186* (2013.01); *F16D 2500/1045* (2013.01); *F16D 2500/1086* (2013.01); *F16D 2500/30403* (2013.01); *F16D 2500/30421* (2013.01); *F16D 2500/30814* (2013.01); *F16D 2500/3163* (2013.01); *F16D 2500/50293* (2013.01); *F16D 2500/7041* (2013.01); *F16D 2500/70426* (2013.01); *F16D 2500/70428* (2013.01); *F16D 2500/7101* (2013.01); *F16H 2061/1208* (2013.01)

(58) Field of Classification Search
 USPC ...................................... 701/67, 30
 See application file for complete search history.

(56) References Cited

U.S. PATENT DOCUMENTS

| | | | | |
|---|---|---|---|---|
| 2,453,957 | A * | 11/1948 | Allen | 192/84.21 |
| 3,672,476 | A * | 6/1972 | Hendershot | 192/21.5 |
| 5,195,621 | A * | 3/1993 | Dull et al. | 192/3.29 |
| 5,778,329 | A * | 7/1998 | Officer et al. | 701/55 |
| 6,234,290 | B1 * | 5/2001 | Drexl et al. | 192/85.51 |
| 6,314,342 | B1 * | 11/2001 | Kramer et al. | 701/1 |
| 6,629,026 | B1 * | 9/2003 | Baraszu et al. | 701/22 |
| 6,770,010 | B2 * | 8/2004 | Matsumura et al. | 477/124 |
| 7,286,922 | B1 * | 10/2007 | Fischer et al. | 701/51 |
| 7,305,297 | B2 * | 12/2007 | Yasui et al. | 701/103 |
| 7,949,453 | B2 * | 5/2011 | Parigger et al. | 701/67 |
| 8,147,373 | B2 * | 4/2012 | Soliman et al. | 477/3 |
| 8,249,786 | B2 * | 8/2012 | Yoshino et al. | 701/55 |
| 8,352,140 | B2 * | 1/2013 | Herter et al. | 701/67 |
| 2002/0157914 | A1 | 10/2002 | Bassett | |
| 2003/0153429 | A1* | 8/2003 | Boll | 477/6 |
| 2004/0054283 | A1* | 3/2004 | Corey et al. | 600/438 |
| 2004/0174770 | A1* | 9/2004 | Rees | 367/7 |

(Continued)

FOREIGN PATENT DOCUMENTS

| | | |
|---|---|---|
| CN | 1431524 A | 7/2003 |
| CN | 101266197 A | 9/2008 |

(Continued)

*Primary Examiner* — John R Olszewski
*Assistant Examiner* — Jean-Paul Cass (57) ABSTRACT

A method to control a clutch in a transmission includes monitoring a frequency response of the clutch including monitoring a response repeating one time per revolution of the clutch a response repeating more than one time per revolution of the clutch. A ratio of the response repeating more than one time per revolution of the clutch to the response repeating one time per revolution of the clutch is determined and compared to a first threshold ratio. A likely shudder condition is indicated based upon the comparing.

12 Claims, 5 Drawing Sheets

(56) References Cited

U.S. PATENT DOCUMENTS

| | | |
|---|---|---|
| 2009/0149298 A1* | 6/2009 | Otanez et al. ............... 477/176 |
| 2010/0185373 A1* | 7/2010 | Herter et al. ................ 701/67 |
| 2011/0166758 A1* | 7/2011 | Otanez et al. ............... 701/67 |
| 2012/0115679 A1* | 5/2012 | Doering et al. .............. 477/70 |
| 2012/0290167 A1* | 11/2012 | Mordukhovich et al. ..... 701/29.5 |

FOREIGN PATENT DOCUMENTS

| | | |
|---|---|---|
| DE | 29920027 | * 12/2000 |
| DE | 102004036054 A1 | 3/2005 |

* cited by examiner

APPARATUS AND METHOD FOR OPERATING A CLUTCH IN A TRANSMISSION

TECHNICAL FIELD

This disclosure is related to a friction based torque transfer device.

BACKGROUND

The statements in this section merely provide background information related to the present disclosure. Accordingly, such statements are not intended to constitute an admission of prior art.

In a vehicle, there are multiple devices that utilize a friction plate, i.e., a clutch, to rotatably interconnect members thereby transferring torque from one device to another. A gear ratio selectable transmission transfers torque from a torque machine, such as an engine or motor, to a driveline for providing motive force for the vehicle. The transmission provides several gear ratios to increase or decrease the amount of torque delivered to the driveline.

Transmissions may have manually selectable gears, typically referred to as a manual transmission, or automatically selected gears typically referred to as an automatic transmission. In a vehicle equipped with a manual transmission, a vehicle operator is able to disengage the clutch while selecting a forward or reverse gear. After a gear is selected, the operator releases the clutch pedal to engage the rotating assembly thereby transferring the torque produced by the motor to the driveline. Automatic transmissions are typically hydraulic fluid driven and have a fluid coupling, typically referred to a torque converter, in place of the clutch and are controlled by a control module. Automatic transmissions typically are less efficient due to viscous and pumping losses. A third type of transmission is known and is typically referred to as a semi-automatic transmission. The semi-automatic transmission can be an automated manual transmission or a dual clutch transmission with at least one clutch but activation and gear selection can be operated hydraulically, electronically, or electro-hydraulically as controlled by a control module. The automated manual transmission has a single clutch and is a similar configuration as the manual transmission. The dual clutch transmission includes two clutches with one clutch able to select odd gear sets and the other clutch able to select even gear sets. The control module is capable of selecting a preferred operating gear ratio and automatically shifting into the selected gear. The control module may also accept inputs from the operator as to when to select and what gear selection should be made and performs the gear change as commanded.

The semi-automatic transmission may be either a wet clutch, one in which a transmission fluid is maintained around the clutch, or a dry clutch, one without fluid. A wet clutch will typically be used to provide a smoother clutch engagement, higher power density, and longer slip, while a dry clutch can provide a higher efficiency. The semi-automatic transmission, either wet or dry clutch, typically provides higher efficiency than the manual and automatic transmissions. However, the application of the clutch can provide noticeable feedback through the driveline as the clutch becomes engaged with the flywheel. The feedback occurs as an output torque variation due to the friction material and steel surface friction interface experiencing a stick-slip occurrence, commonly referred to as shudder. Shudder occurs most frequently after a period of use due to contamination. In the case of a wet clutch, shudder will be more likely to occur when the fluid degrades.

SUMMARY

A method to control a clutch in a transmission includes monitoring a frequency response of the clutch including monitoring a response repeating one time per revolution of the clutch a response repeating more than one time per revolution of the clutch. A ratio of the response repeating more than one time per revolution of the clutch to the response repeating one time per revolution of the clutch is determined and compared to a first threshold ratio. A likely shudder condition is indicated based upon the comparing.

BRIEF DESCRIPTION OF THE DRAWINGS

One or more embodiments will now be described, by way of example, with reference to the accompanying drawings, in which:

FIG. 3-1 illustrates exemplary wet clutch friction material testing that depicts clutch speed, friction levels, and load over time, in accordance with the disclosure;

FIG. 3-2 illustrates exemplary wet clutch friction material engagement with degraded transmission fluid during testing that depicts clutch speed, friction levels, and load over time, in accordance with the disclosure;

FIG. 4-1 illustrates exemplary clutch engagement frequency amplitudes over a sampling frequency with transmission fluid having approximately 1,000 cycles and the motor operating at 290 rotations per minute (RPM), in accordance with the present disclosure;

FIG. 4-2 illustrates exemplary clutch engagement frequency amplitudes over a sampling frequency with degraded transmission fluid and the motor operating at approximately 290 RPM, in accordance with the present disclosure;

FIG. 4-3 illustrates exemplary clutch engagement frequency amplitudes over a sampling frequency with severely degraded transmission fluid and the motor operating at approximately 290 RPM, in accordance with the present disclosure.

DETAILED DESCRIPTION

Figure 1:
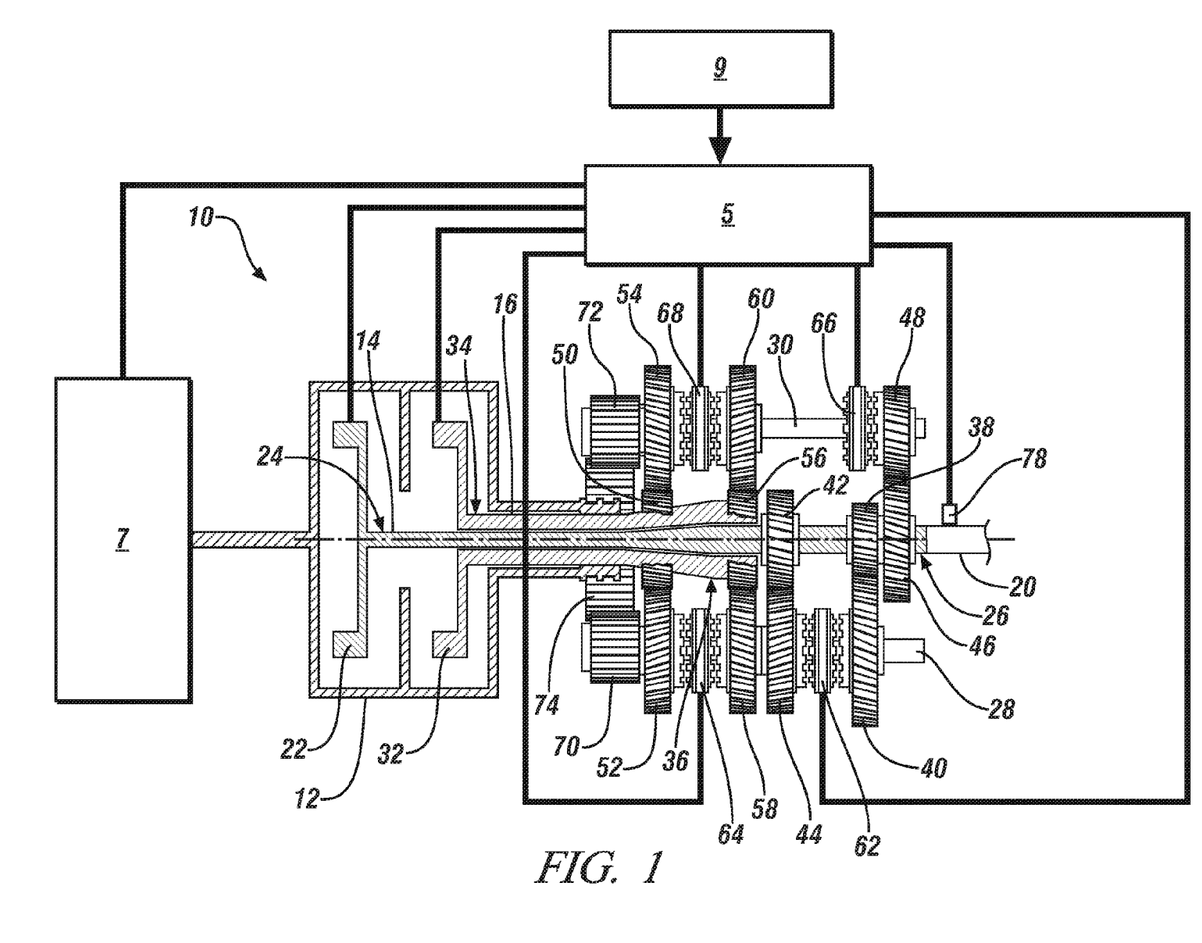
FIG. 1 illustrates an exemplary six speed dual clutch transmission, in accordance with the present disclosure.

Referring now to the drawings, wherein the showings are for the purpose of illustrating certain exemplary embodiments only and not for the purpose of limiting the same, FIG. 1 is a schematic illustration of an exemplary six speed dual clutch transmission (DCT) 10, in accordance with the present disclosure. The DCT 10 selectively interconnects a torque machine 7, such as an internal combustion engine or an electric motor, to a driveline of a vehicle to provide tractive force to motivate the vehicle. The DCT includes a series of gear ratios that represent torque multiplication factors for supplying an amount of torque to the driveline. The DCT can have a number of forward gears and a reverse gear. The DCT 10 may be referred to by the number of forward gears. Thus, for a six-speed DCT 10, the DCT 10 has six forward gears, each having a representative sequentially higher gear number from first to sixth, and a single reverse gear. The torque multiplication factor decreases as the DCT 10 increases the gear number. For example, in first gear the DCT 10 has the highest torque multiplication factor of the forward gears with a reduction in the torque multiplication factor occurring with each increase in gear number with fifth and sixth gears typically being overdrive gears. Although a six-speed DCT 10 is discussed in detail, the disclosure is not so limited.

The DCT 10 includes a control module 5, a clutch housing 12, an inner transmission shaft 14, an outer transmission shaft 16, a plurality of gears, and an output shaft 20. The clutch housing 12 is rotatably connected to the torque machine 7 for transferring torque thereto. The clutch housing 12 accommodates a first clutch 22 interconnected to the inner transmission shaft 14 at a clutch end 24. The inner transmission shaft 14 extends from the first clutch 22 concentrically through the outer transmission shaft 16 to a gear end 26. The gear end 26 includes a plurality of input gears engaged to a like amount of output gears on a first parallel shaft 28 and a second parallel shaft 30. In the exemplary six-speed DCT 10, the inner shaft includes a first input gear 38 engaged to first output gear 40, a third input gear 42 engaged with third output gear 44, and a fifth input gear 46 engaged with fifth output gear 48. Each set of input and output gears represent a separate gear number within the transmission, i.e., the first input gear 38 and first output gear 40 represent first gear, the third input gear 42 and third output gear 44 represent third gear, and the fifth input gear 46 and fifth output gear 48 represent fifth gear.

The clutch housing 12 also accommodates a second clutch 32 interconnected to the outer transmission shaft 16 at a clutch end 34. The outer transmission shaft 16 extends concentrically around the inner transmission shaft 14 to a gear end 36. The gear end 36 includes a plurality of input gears engaged to output gears on both the first and second parallel shafts 28, 30, respectively. In the exemplary six-speed DCT 10, the outer shaft 16 includes a second input gear 50 engaged with a second output gear 52 located on the first parallel shaft 28 and a seventh output gear 54 located on the second parallel shaft 30. The outer shaft 16 further includes a fourth input gear 56 engaged with a fourth output gear 58 located on the first parallel shaft 28 and a sixth output gear 60 located on the second parallel shaft 30. Each set of input and output gears represent a separate even gear number and the reverse gear, i.e., the second input gear 50 and second output gear 52 represent second gear, the second input gear 50 and seventh output gear 54 represent the reverse gear, the fourth input gear 56 and fourth output gear 58 represent fourth gear, and the fourth input gear 56 and sixth output gear 60 represent sixth gear. As will be recognized, the odd series of gear numbers are associated with the inner transmission shaft 14 and the even series of gear numbers and reverse are associated with the outer transmission shaft 16.

A plurality of gear selectors are slidably engaged with the first and second parallel shafts 28, 30 adjacent one or more of the output gears 40, 44, 46, 52, 54, 58, 60 for engagement therewith. Engaging one of the plurality of gear selectors with an output gear 40, 44, 46, 52, 58, 60 locks the first parallel shaft 28 or the second parallel shaft 30 with the selected output gear thereby transferring torque from the inner transmission shaft 14 or the outer transmission shaft 16. The first parallel shaft 28 includes a first gear selector 62 and a second gear selector 64. The second parallel shaft 30 includes a third gear selector 66 and a fourth gear selector 68. The first gear selector 62 is operative to slidably engage either the first output gear 40 or the third output gear 44. The second gear selector 64 is operative to slidable engage either the second output gear 52 or the fourth output gear 58. The third gear selector 66 is operative to slidably engage the fifth output gear 48. The fourth gear selector 68 is operative to slidably engage either the seventh output gear 54 or the sixth output gear 60.

The first parallel shaft 28 and the second parallel shaft 30 include rotationally secured first and second transfer gears 70, 72 respectively. The first and second transfer gears 70, 72 are engaged to a conveying gear 74 for transferring the torque to the output shaft 20. In one embodiment, the output shaft 20 is connected to a differential for dividing the torque between at least two wheels of the vehicle.

The control module 5 is signally connected to send and receive operational information and control signals regarding operation of the torque machine 7, the first and second clutch 22, 32, each gear selector 62, 64, 66, 68, and a torque sensor 78. Torque sensor 78 is located to monitor a torque within the transmission. This torque within the transmission is transmitted through engaged clutches transferring torque from an engine or motor to the transmission. The signal from torque sensor 78 can be used to monitor operation of the transmission including the clutches. The control module 5 also receives information regarding operator inputs 9, such as acceleration and brake commands.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

The torque machine 7 is operational to meet a torque request when the control module 5 detects the appropriate operator input 9. The torque from the torque machine 7 is transferred to the clutch housing 12 which rotates independently of the remainder of the DCT 10. Selection of a forward drive position with a gear selector causes the control module 5 to command engagement of first gear by engaging the first gear selector 62 with the first output gear 40 and to prepare for operation in second gear by engaging the second gear selector 64 with the second output gear 52. The control module 5 receives operator inputs 9 and determines an operator torque request has been received. The control module 5 commands an appropriate amount of torque from the torque machine 7 to be transferred through first gear. The first clutch 22 is engaged with the clutch housing 12 to transfer torque from the clutch housing to the first input gear 38 through the inner transmission shaft 14. Engaging the first clutch 22 with the clutch housing 12 may require the control module 5 to slowly engage the first clutch 22, commonly referred to as clutch slip. Clutch slip can create a steady or progressive transfer of torque from the torque machine 7 through the first clutch 22 and the DCT 10. The torque is transferred to the first transfer gear 70 due to the first gear selector 62 engagement with the first output gear 40. The torque is then transferred through the first parallel shaft 28 thereby transferring torque to the conveying gear 74 and to the remainder of the driveline by way of the output shaft 20.

Selection of second gear occurs when the control module 5 determines the operating conditions of the torque machine 7 and/or the operator inputs require transition to a higher gear number, e.g., the torque machine has reached a predetermined operating limit and to improve operational efficiency. The first clutch 22 begins to be disengaged with the clutch housing 12 by using clutch slip while the second clutch 32 becomes engaged with the clutch housing 12 by using clutch slip. The second clutch 32 transfers the torque from the torque machine 7 to the outer transmission shaft 16, thereby spinning the first input gear 50 and the second input gear 56. In preferred operation, a transition from first gear to second gear occurs with little or no torque disruption.

Second gear operation continues and the control module 5 continues to monitor operator inputs 9 and torque machine operation 7 to predict the next operational gear number. For example, if the operator is requesting acceleration, the control module 5 may determine an upshift to the next higher gear number will be required. Likewise, if the operator is decelerating, the control module 5 may determine a downshift to the next lower gear number will be required. Determination of an upshift from gear number one to gear number two will result in the control module 5 commanding the first gear selector 62 to engage with the third output gear 44 in preparation of the commanded shift. The control module 5 may then command the upshift to gear number three thereby engaging and disengaging the respective first and second clutches 22, 32 utilizing clutch slip as discussed above. Determination of a downshift from gear number two to gear number one will result in the control module 5 commanding the first gear selector 62 to maintain engagement with the first output gear 40 in preparation of the commanded shift. The control module 5 may then command the downshift to gear number one thereby engaging and disengaging the respective first and second clutches 22, 32 utilizing clutch slip as discussed above.

Similar operation occurs with each gear number wherein the control module 5 makes a determination of the present gear number operation and a predicted next gear number operation and engages the appropriate gear selector 62, 64, 66, 68 to the appropriate output gear 40, 44, 48, 52, 54, 58, 60 and transfers torque from the torque machine 7 through the appropriate first or second clutch 22, 32. Operator selection of a park or neutral position on a gear selector results in the control module 5 preparing for operation in gear number one and the reverse gear. Operator selection of a drive position or a first gear position on a gear selector results in the control module 5 preparing for operation in gear number one and gear number two.

The first and second clutches 22, 32 are controlled to an amount of slip as determined by the control module 5 during activation and deactivation. The first and second clutches 22, 32 are wet clutches lubricated by a transmission fluid to maintain specific operating conditions, such as, friction coefficients and temperature, to clear debris from the mating surfaces of the first and second clutches 22, 32 and the clutch housing 12, and to reduce clutch shudder. Clutch shudder occurs as the mating surfaces of the first and second clutches 22, 32 engage the clutch housing 12 and cause an uncontrolled deflection of the first and second clutches 22, 32. The transmission fluid degrades with use resulting in less predictable clutch slip and increasing the effects of clutch shudder resulting in increases in operator disruptions, e.g., noise and torque disturbances.

Clutch shudder can be determined by the output of the torque sensor 78. The torque sensor 78 outputs data to the control module 5 representative of the amount of torque at the output shaft 20. The first and second clutches 22, 32 transmit torque when engaged with the clutch housing 12. An interruption of torque occurs when the first and second clutches 22, 32 become disengaged with the clutch housing 12 during clutch shudder. The torque sensor 78 can detect the torque disruptions caused by first and second clutches 22, 32 becoming engaged and disengaged with clutch housing 12 and sending the output to the control module 5 for determination of the occurrence of clutch shudder.

Figure 2:
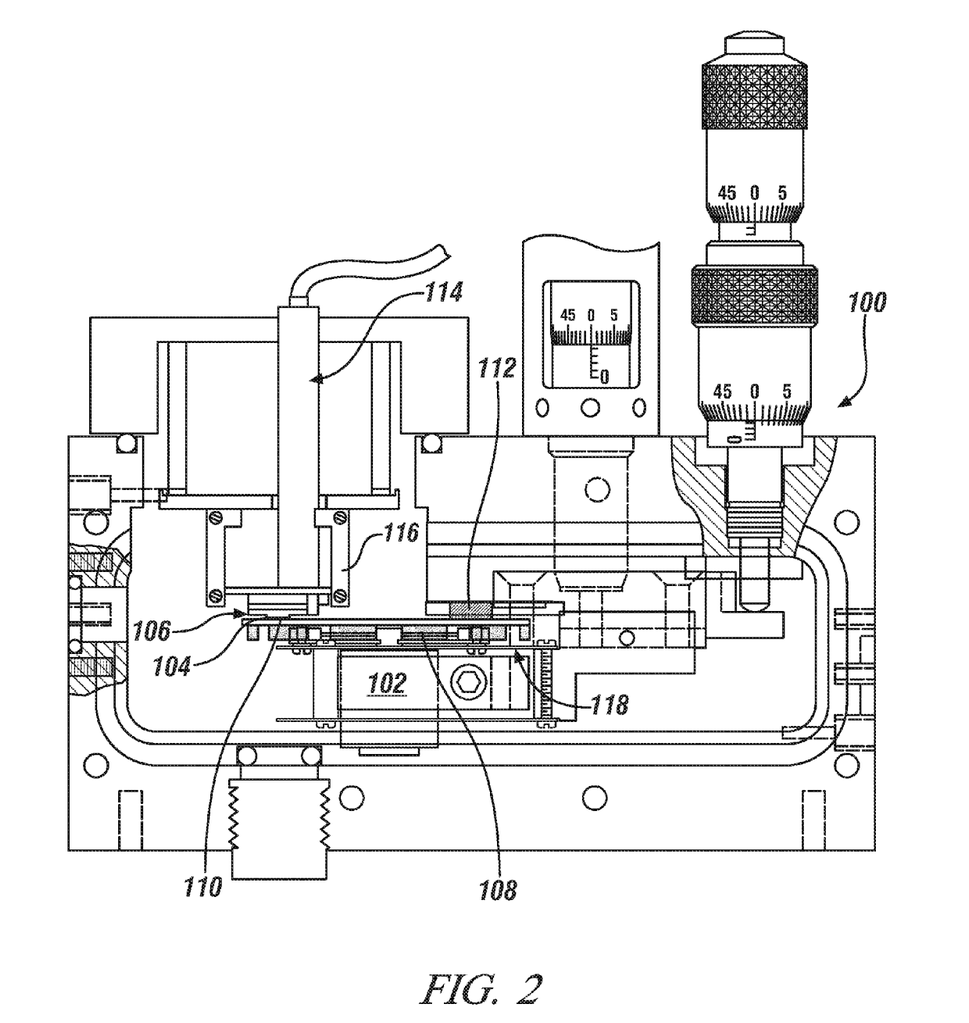
FIG. 2 illustrates an exemplary test fixture that is capable of repeatedly and consistently replicating clutch shudder, in accordance with the present disclosure.

Clutch shudder can be replicated on a test fixture. FIG. 2 is a depiction of an exemplary test fixture 100 that is capable of repeatedly and consistently replicate clutch shudder. The test fixture 100 includes a motor 102, an engagement plate 104, a pin 106, and a plurality of mirrors 108. Engagement plate 104 is in rotational communication with the motor 102 and is supported by at least one biasing member 118. The motor 102 rotates the engagement plate 104 at a relatively high rate of speed, e.g., approximately 5 meters per second (m/s). The plurality of mirrors 108 is secured to the engagement plate 104 and is able to detect the speed of the engagement plate 104 as each mirror is passed by a light sensor.

The pin 106 is equipped with a portion of friction material 110 that is similar in construction to friction material that is used on an exemplary clutch surface. The pin 106 is placed in contact with the surface of the engagement plate 104 and provides a load output relative to run-out of the engagement plate 104, i.e., minute variations in height of the plate surface. A roller bearing 112 is placed opposite the pin 106 to balance the force created from the pin 106 contacting the engagement plate 104. The pin 104 is supported by at least one biasing member 116. A temperature sensor 114 can be included to record absolute temperature and changes in temperature as required. A transmission fluid is placed upon the surface of the engagement plate 104 that is representative of the transmission fluid used in the DCT 10 to provide similar benefits as in the DCT 10 and create lubricated friction between the pin 106 and the engagement plate 104.

Figure 31:
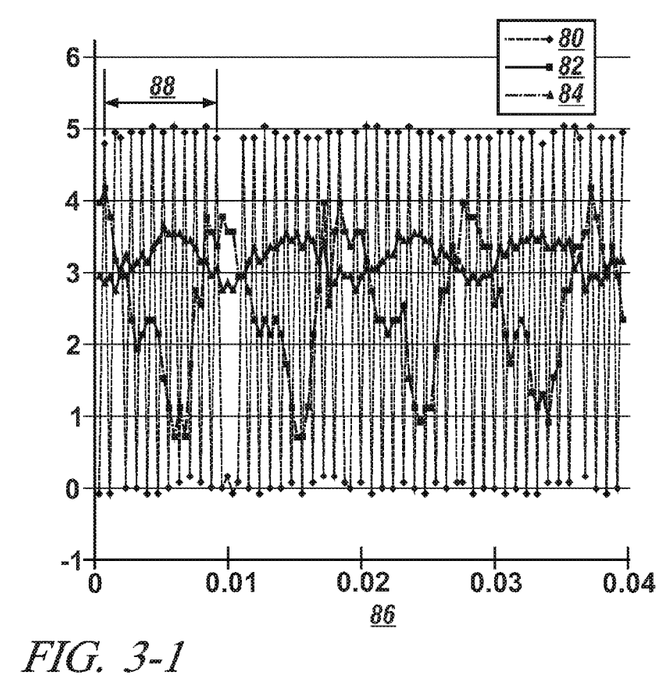

FIG. 3-1 is graphical data of exemplary wet clutch friction material testing that depicts clutch speed 80 in 12 signals per revolution, friction levels 82 in 100*Newtons, and load 84 in 7*Newtons over time 86. Load 84 is indicative of engagement plate run-out. That is, as a high spot on the engagement plate 104 is presented to the pin 106, the load increases. Likewise, as a low spot on the engagement plate 104 is presented to the pin 106, the load decreases. The load 84 displays a cyclical pattern due to the rotation of the engagement plate 104 wherein the pin 106 is exposed to the identical run-out repeatedly. The friction level 82 is generally cyclical and has a generally inverse relation to the load 84, i.e., as the load 84 increases the friction level 82 between the clutch and the clutch housing decreases. The clutch speed 80 is recorded as each mirror 108 passes by the light sensor. In the exemplary test procedure, there are twelve mirrors 108 and therefore every twelve speed recordings represents a full rotation, or a single cycle as indicated by arrow 88, of the engagement plate 104.

Figure 32:
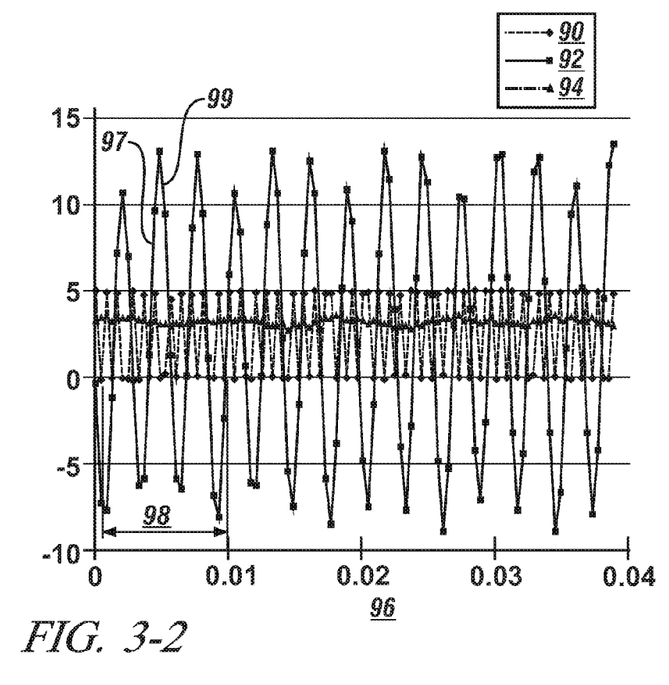

FIG. 3-2 is graphical data of exemplary wet clutch friction material engagement with degraded transmission fluid during testing of clutch run-out that depicts clutch speed 90 at twelve signals per revolution, friction levels 92 in 100*Newtons, and load 94 in 7*Newtons over time 96. The testing apparatus and method are the same as the test associated with FIGS. 2 and 3-1; however, the transmission fluid has been degraded due to use factors, e.g., heat, loss of additives, and contamination, over time. In the exemplary test, the components have been through approximately 25,000 cycles with a single cycle indicated by arrow 98 which is representing every twelve speed recordings. The engagement plate 104 is rotated at high velocity, approximately 5 m/s, and the pin 106 is held stationary, engaged with the surface of the engagement plate 104 to measure load 94 and friction levels 92 associated with the engagement plate run-out. The loading 94 and the clutch speed 90 indicate the cyclical loading as that associated with FIG. 3-1.

The friction level 92 displays a result representative of clutch shudder. The friction level 92 is cyclical and varies from a high of approximately 11.0 to 14.0 scaled Newtons to a low of approximately −6.0 to −9.0 scaled Newtons. The friction level 92 between the pin 106 and the engagement plate 104 increases with the degrading of the transmission fluid resulting in shudder. Shudder can be referred to as stick-slip that represents the extreme high and low friction levels between the pin 106 and the engagement plate 104. The friction level 92 being higher than recorded in FIG. 3-1 is indicative of the stick portion of the stick-slip occurrence wherein the friction increases beyond the expected amount, as indicated by the friction level 92 having a positive slope, exemplified at 97. The friction level 92 increases until a static coefficient of friction level has been reached, as indicated as the high point of the friction level 92. The friction level 92 drops suddenly upon reaching the static coefficient of friction thereby causing the slip portion of the stick-slip condition to occur. The slip portion of the stick-slip condition is indicated by the friction level 92 reaching a negative slope, as exemplified at 99. The friction level 92 at the negative slope 99 indicates a release of the engagement disc 104 from a wind-up condition. The wind-up condition occurs when the friction levels between the pin 106 and the engagement disk 104 become high and slows or stops the engagement disk 104 during the stick portion of the stick-slip condition. The slip portion of the stick-slip condition occurs and releases energy that was stored during the stick portion of the stick-slip condition. Thus, a repeatedly high friction level to a low friction level event occurs without relation to the load 94.

The shudder occurs due to the repeated uncontrolled cycling of the stick-slip condition. The friction level 92 reaches a peak of between approximately 11 and 14 scaled Newtons. The pin 106 is able to slide in relation to the engagement plate 104 once the coefficient of friction has been reached resulting in the negative slope of the friction level 92. The pin 106 is able to reengage the engagement plate once the friction levels have reached a certain point between approximately −5 and −9 scaled Newtons resulting in the stick portion of the stick-slip condition to reoccur and the friction level 92 to rise again. The repeated stick-slip occurrence is felt as shudder when it is transmitted through the driveline which can be felt by the operator and detected by the torque sensor 78.

Figure 41:
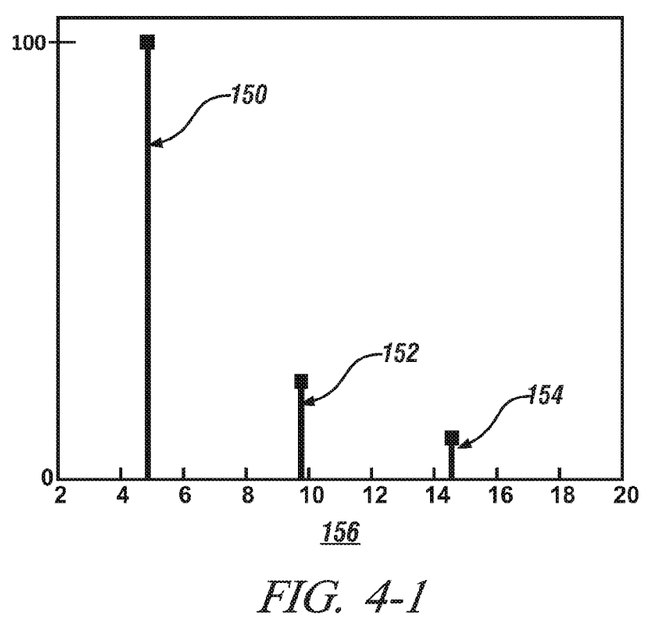

FIG. 4-1 is graphical data representing exemplary clutch engagement frequency amplitudes over a sampling frequency 156 in hertz (Hz) with transmission fluid having approximately 1,000 cycles and the motor operating at approximately 290 rotations per minute (RPM). The frequency response can be determined using a fast Fourier transform. A frequency response of a spinning engagement plate simulating a spinning clutch can include a response repeating once per revolution or a one per revolution response 150, a response repeating twice per revolution or a two per revolution response 152, and a response repeating three times per revolution or a three per revolution response 154. A one per revolution response describes normal oscillation from the spinning clutch. Two per revolution and three per revolution response indicates conditions necessary to create a shudder. Larger values of the two per revolution, three per revolution, or more than three per revolution responses indicate a likely shudder condition. By comparing the one per revolution response to the two per revolution and three per revolution responses, a determination can be made regarding the likely shudder condition for the clutch. In FIG. 4-1, the one per revolution response 150 is the largest value. The two per revolution response 152 has a substantial decrease in amplitude from the one per revolution response. The three per revolution response 154 has a further decrease in amplitude from the two per revolution response. The decrease in amplitudes indicates that the system being evaluated is not likely to shudder.

Figure 42:
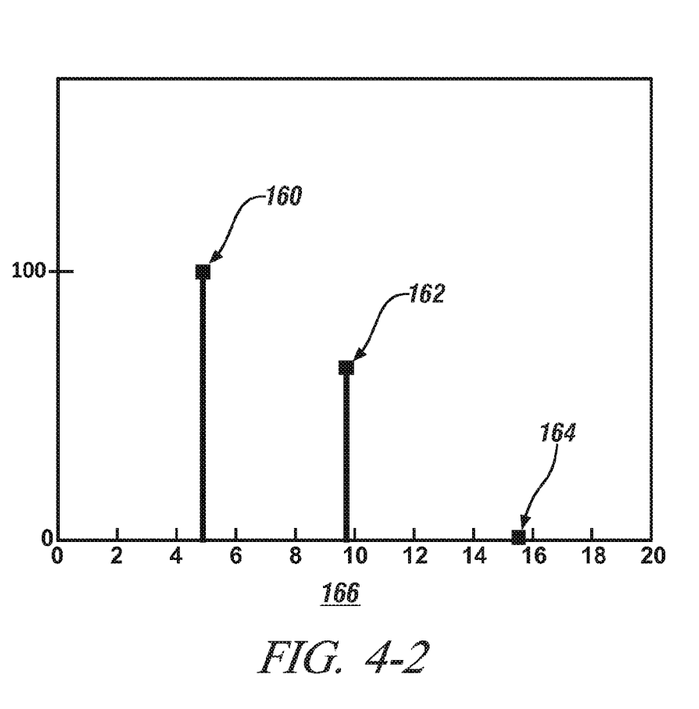

FIG. 4-2 is graphical data representing exemplary clutch engagement frequency amplitudes over a sampling frequency 166 with degraded transmission fluid, having approximately 12,000 cycles, and the motor operating at approximately 290 RPM. The frequency response is determined on a one per revolution 160, two per revolution 162, and three per revolution 164 signal. The transmission fluid having approximately 12,000 cycles is representative of transmission fluid that has degraded through use. The one per revolution response 160 is the largest value. The two per revolution response 162 has substantially increased in amplitude in relation to the one per revolution response 160 and from the two per revolution response 152 of FIG. 4-1. The three per revolution response 164 indicates a decrease in amplitude in relation to the one per revolution response 160 and the three per revolution response 154 of FIG. 4-1. The graphical data depicts the occurrence of shudder as the two per revolution response 162 increases relative to the one per revolution response 160 and can be used to indicate a system likely to include shudder, for example, corresponding to a system with degraded transmission fluid.

Figure 43:
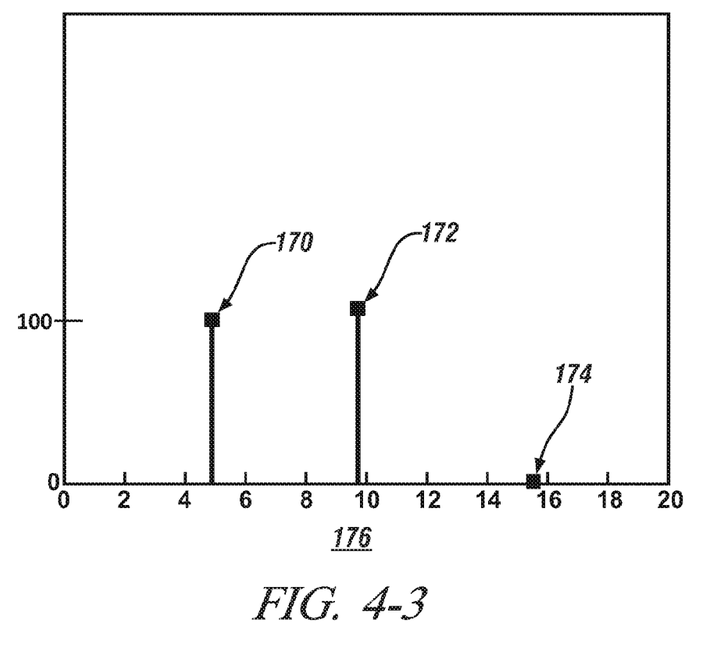

FIG. 4-3 is graphical data representing exemplary clutch engagement frequency amplitudes over a sampling frequency 176 with severely degraded transmission fluid, after approximately 27,000 cycles, and the motor operating at approximately 290 RPM. The frequency response is determined on a one per revolution 170, two per revolution 172, and three per revolution 174 signal. The transmission fluid having approximately 27,000 cycles is representative of transmission fluid that has substantially degraded. The one per revolution response 170 is less than the two per revolution response 172. The two per revolution 172 substantially increases in relation to the one per revolution response 170 and from the two per revolution response 162 of FIG. 4-2. The three per revolution response 176 indicates a decrease in amplitude in relation to the one per revolution response 170 and the three per revolution response 164 of FIG. 4-2. The graph depicts a worsening of overall shudder as the two per revolution response 172 increases relative to the one per revolution response 170 and can be used to indicate a system likely to include shudder, for example, corresponding to a system with severely degraded transmission fluid.

The increase of amplitude of the two per revolution response and the decrease of amplitude of the three per revolution response in relation to the one per revolution response can result in a diagnostic to determine the likelihood that a shudder condition exists in a clutch. By monitoring a torque, for example, the output of torque sensor 78, an examination of the frequency response of the torque signal can be used to diagnose a likely shudder condition in the associated clutch.

Figure 5:
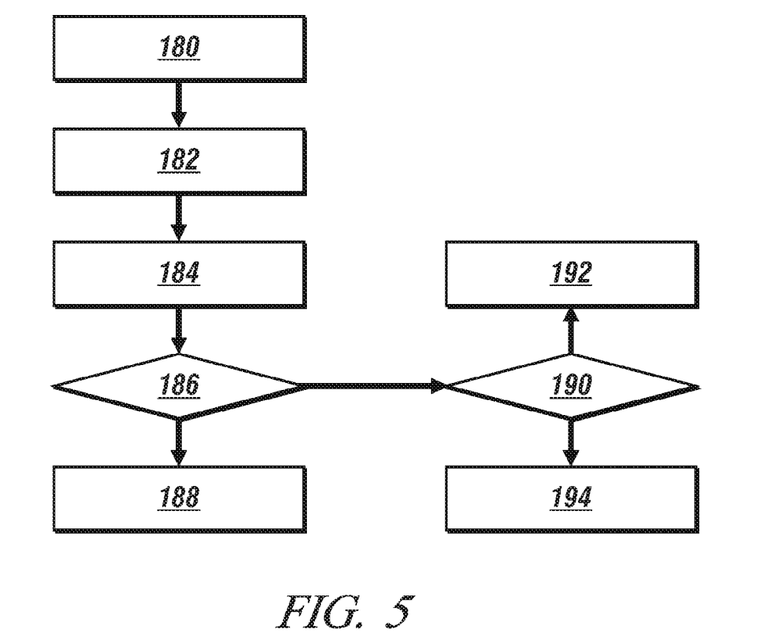
FIG. 5 illustrates a logic diagram for determining the degradation of the transmission fluid based upon shudder detection, in accordance with the present disclosure.

FIG. 5 is an exemplary logic diagram for determining the degradation of the transmission fluid based upon shudder detection. Table 1 is provided as a key for the exemplary logic diagram wherein the numerically labeled blocks and the corresponding functions are set forth as follows.

TABLE 1

FIG. 5

| BLOCK | BLOCK CONTENTS |
|---|---|
| 180 | Determine "1/revolution" response |
| 182 | Determine "2/revolution" response |
| 184 | Determine "3/revolution" response |
| 186 | Is "2/revolution" = or >0.5 * "1/revolution"? |
| 188 | If 186 is yes, take remedial action |
| 190 | If 186 is no, is "2/revolution" or "3/revolution" = or >0.3 * "1/revolution"? |
| 192 | If 190 is no, allow the maximum slip time |
| 194 | If 190 is yes, take remedial action |

The torque sensor 78 sends data to the control module 5. The control module determines the one per revolution response at 180, the two per revolution response at 182, and the three per revolution response at 184. The two per revolution response 182 is compared to one-half of the one per revolution response 180. When the two per revolution response 182 is equal to or greater than a first threshold, the control module 5 determines a large amount of shudder has occurred and remedial action 188 can be taken. A threshold can be an absolute value, for example, describing a calibrated response. In another example, the threshold can be a threshold ratio of a response repeating more than one time per revolution to the one per revolution response. In this example, a first threshold ratio based upon a two per revolution response 182 equaling one-half of the one per revolution response 180 can be used. A ratio of the two per revolution response 182 to the one per revolution response 180 is determined, and this determined ratio is compared to the first threshold ratio. Remedial action 188 can include sending information to the operator, e.g., illuminating a warning device and sending a message via a message center recommending to change the transmission fluid, and modifying the operation of the clutch, e.g., limiting the maximum allowable amount of clutch slip, modifying the slip speed of the clutch, requesting a torque reduction, shifting to a different gear, and other actions that may reduce or prevent shudder.

When the determined ratio based upon the two per revolution response 182 is not equal to or greater than the first threshold ratio or one-half of the one per revolution response 180, the control module 5 determines if either the determined ratio, the first determined ratio, or a second determined ratio based upon the three per revolution response 184 is equal to or greater than a second, lower threshold ratio. In this example, the second, lower threshold can be based upon either the first determined ratio based upon the two per revolution response 182 or the second determined ratio based upon the three per revolution response 184 equaling three tenths of the one per revolution response 180, indicating a moderate or lesser but measurable amount of shudder. If the neither of first determined ratio based upon the two per revolution response 182 or the second determined ratio based upon the three per revolution response 184 is not equal to or greater than three tenths of the one per revolution response 180, then the maximum allowable clutch slip is permitted. When either the first determined ratio based upon the two per revolution response 182 or the second determined ratio based upon the three per revolution response 184 is equal to or greater than three tenths of the one per revolution response 180, the control module 5 determines shudder is occurring and remedial action 194 can be taken. Remedial action 194 can include sending information to the operator, e.g., illuminating a warning device and sending a message via a message center, and modifying the operation of the clutch, e.g., limiting the maximum allowable amount of clutch slip, modifying the slip speed of the clutch, requesting a torque reduction, shifting to a different gear, and other actions that may reduce or prevent shudder.

The above method uses a first threshold and a second threshold to initiate remedial actions in response to measured shudder. Any number of thresholds can be utilized to initiate different remedial actions in response to different levels of shudder. The values utilized as the thresholds can be developed experimentally, empirically, predictively, through modeling or other techniques adequate to accurately predict clutch operation, and a multitude of different threshold levels can be stored for different conditions or operating ranges. In the exemplary embodiment of FIG. 5, the first threshold representing a large amount of shudder can be used to initiate a more serious remedial action. The second threshold representing a moderate amount of shudder can be used to initiate a less serious remedial action. According to one exemplary embodiment, a more serious remedial action can include an action affecting operation of the clutch, for example, decreasing a maximum allowed slip time, and a less serious remedial action can include an action generating a warning to the operator or logging the shudder event in a maintenance log without affecting operation of the clutch.

The disclosed methods describe comparing a response repeating more than one time per revolution to a threshold. Different thresholds can be used for different signals. For example, a two per revolution threshold ratio can be used to compare to a first determined ratio based upon a monitored two per revolution response, and a three per revolution threshold ratio can be used to compare to a second determined ratio based upon a monitored three per revolution response.

Although a tandem style clutch is depicted, it will be apparent that operation of the DCT 10 can include other arrangements of dual clutches, such as independent offset and concentric. It is recognized that this disclosure is equally operable with transmissions including wet or dry clutches. It is understood that this disclosure is further operable on other power transfer devices that can shudder as wear increases, e.g., shifting clutches, continuously variable transmission belts, and limited slip differentials. It will be appreciated that although certain specific thresholds were discussed in detail to indicate an inappropriate amount of shudder, the thresholds can be modified for specific applications.

A torque sensor can be located in a number of locations within the transmission or powertrain to monitor torque being transmitted through a clutch. In an embodiment including two or more clutches, it can be advantageous to utilize a torque sensor monitoring each of the clutches individually. In such an embodiment, the output of each sensor can be analyzed according to the methods disclosed herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control module-implemented method to control a clutch in a transmission, comprising:
monitoring a frequency response at a single location in the transmission comprising a point of engagement between mating surfaces of the clutch and a clutch housing when the clutch is cyclically loaded during a transition from a present gear number operation to a predicted next gear number operation, comprising:
monitoring a first amplitude indicative of a number of occurrences a response repeats one time per revolution of the clutch, said response being indicative of a peak friction value between the mating surfaces; and
monitoring at least a second amplitude indicative of a number of occurrences the response repeats more than one time per revolution of the clutch;
determining a ratio of at least the second amplitude to the first amplitude; and
during the transition from the present gear number operation to the predicted next gear number operation when the clutch is cyclically loaded, determining one of:
a first shudder condition indicative of shudder requiring remedial action that includes modifying operation of the clutch when the ratio of at least the second amplitude to the first amplitude is at least a first threshold ratio of fifty percent;
a second shudder condition indicative of shudder requiring remedial action that includes generating a service warning indicating a need to change transmission fluid when the ratio of at least the second amplitude to the first amplitude is less than the first threshold ratio and at least a second threshold ratio of thirty percent.

2. The method of claim 1, wherein modifying the operation of the clutch comprises reducing a maximum allowed slip time of the clutch.

3. The method of claim 1, wherein modifying the operation of the clutch comprises advancing a full engagement of the clutch.

4. The method of claim 1, wherein modifying the operation of the clutch comprises modifying a constant slip speed of the clutch.

5. The method of claim 1, wherein the transmission comprises a dual clutch transmission.

6. The method of claim 1, wherein monitoring at least the second amplitude indicative of the number of occurrences the response repeats more than one time per revolution of the clutch comprises monitoring the second amplitude indicative of a number of occurrences the response repeats two times per revolution of the clutch.

7. The method of claim 1, wherein monitoring at least the second amplitude indicative of the number of occurrences the response repeats more than one time per revolution of the clutch comprises monitoring the second amplitude indicative of a number of occurrences the response repeats three times per revolution of the clutch.

8. The method of claim 1, wherein monitoring at least the second amplitude indicative of the number of occurrences the response repeats more than one time per revolution of the clutch comprises:
monitoring the second amplitude indicative of the number of occurrences the response repeats two times per revolution; and
monitoring a third amplitude indicative of a number of occurrences the response repeats three times per revolution; and
wherein determining the ratio of at least the second amplitude to the first amplitude comprises:
determining a first ratio comprising a ratio of the second amplitude to the first amplitude; and
determining a second ratio comprising a ratio of the third amplitude to the first amplitude; and
wherein the first shudder condition requiring modifying operation of the clutch is determined when the first ratio is at least the first threshold ratio;
wherein the second shudder condition requiring generating the service warning is determined when the first ratio is less than the first threshold ratio and at least one of the first and second ratios is at least the second threshold ratio.

9. The method of claim 1, wherein monitoring the frequency response of the clutch comprises:
monitoring a signal from a torque sensor monitoring the transmission;
utilizing a fast Fourier transform of the monitored signal to determine the first amplitude indicative of the number of occurrences the response repeats one time per revolution of the clutch; and
utilizing a fast Fourier transform of the monitored signal to determine at least the second amplitude indicative of the number of occurrences the response repeats more than one time per revolution of the clutch.

10. A control module-implemented method to control a clutch in a dual clutch transmission, comprising:
monitoring a frequency response at a single location in the transmission comprising a point of engagement between mating surfaces of the clutch and a clutch housing when the clutch is cyclically loaded during a transition from a present gear number operation to a predicted next gear number operation, comprising:
monitoring a first amplitude indicative of a number of occurrences the response repeats one time per revolution of the clutch, said response being indicative of a peak friction value between the mating surfaces;
monitoring a second amplitude indicative of a number of occurrences the response repeats two times per revolution of the clutch; and
monitoring a third amplitude indicative of a number of occurrences the response repeats three times per revolution of the clutch;
determining a first ratio comprising a ratio of the second amplitude to the first amplitude;
determining a second ratio comprising a ratio of the third amplitude to the first amplitude; and
during the transition from the present gear number operation to the predicted next gear number operation
comparing the first ratio to a first threshold ratio equal to fifty percent;
indicating a first shudder condition based upon the comparing indicating the first ratio to be greater than the first threshold ratio, wherein the first shudder condition is indicative of clutch shudder requiring remedial action that includes modifying operation of the clutch;
if the first ratio is not greater than the first threshold ratio, comparing the first ratio and the second ratio to a second threshold ratio equal to thirty percent; and
indicating a second shudder condition based upon the comparing indicating either the first or second ratio to be greater than the second threshold ratio, wherein the second shudder condition is indicative of clutch shudder requiring remedial action that includes generating a service warning indicating a need to change transmission fluid.

11. Apparatus to control a clutch in a transmission, comprising:
- a transmission comprising a clutch;
- a torque sensor located to monitor a torque within the transmission;
- a control module:
  - monitoring a signal from the torque sensor when the clutch is cyclically loaded during engagement between mating surfaces of the clutch and a clutch housing during a transition from a present gear number operation to a predicted next gear number operation;
  - determining a frequency response at a single location in the transmission comprising a point of engagement between mating surfaces of the clutch and the clutch housing based on the monitored signal of the torque sensor, comprising
    - determining a first amplitude indicative of a number of occurrences a response repeats one time per revolution of the clutch, said response being indicative of a peak friction value between the mating surfaces, and
    - determining at least a second amplitude indicative of a number of occurrences a response repeats more than one time per revolution of the clutch;
  - determining a ratio of at least the second amplitude to the first amplitude; and
  - during the transition from the present gear number operation to the predicted next gear number operation, determining one of:
    - a first shudder condition indicative of shudder requiring modifying operation of the clutch when the ratio of at least the second amplitude to the first amplitude is at least a first threshold ratio of fifty percent; and
    - a second shudder condition indicative of shudder requiring generating a service warning indicating a need to change transmission fluid when the ratio of at least the second amplitude to the first amplitude is less than the first threshold ratio and at least a second threshold ratio of thirty percent.

12. The apparatus of claim 11, wherein the clutch comprises one of a wet dual clutch and a dry dual clutch.

* * * * *